(12) United States Patent
Kobayashi

(10) Patent No.: US 7,304,833 B1
(45) Date of Patent: Dec. 4, 2007

(54) SOLID ELECTROLYTIC CAPACITOR

(75) Inventor: Masaaki Kobayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/708,613

(22) Filed: Feb. 21, 2007

(30) Foreign Application Priority Data

Mar. 28, 2006 (JP) ............................ 2006-088412

(51) Int. Cl.
*H01G 9/04* (2006.01)
*H01G 9/145* (2006.01)

(52) U.S. Cl. ...................... 361/532; 361/528; 361/540

(58) Field of Classification Search ................ 361/540, 361/538, 532–533, 528, 541
See application file for complete search history.

(56) References Cited

U.S. PATENT DOCUMENTS

| | | | |
|---|---|---|---|
| 6,870,728 B1 | 3/2005 | Burket et al. | |
| 7,016,180 B2 | 3/2006 | Yoshihara et al. | |
| 7,023,690 B2 | 4/2006 | Yoshihara et al. | |
| 7,038,905 B2 | 5/2006 | Yoshihara et al. | |
| 7,158,366 B2* | 1/2007 | Kobayashi et al. | 361/523 |
| 7,184,257 B2* | 2/2007 | Kobayashi et al. | 361/540 |
| 2005/0201042 A1* | 9/2005 | Yoshihara et al. | 361/508 |
| 2005/0213287 A1* | 9/2005 | Yoshihara et al. | 361/533 |

FOREIGN PATENT DOCUMENTS

| | | |
|---|---|---|
| JP | A 02-268484 | 11/1990 |
| JP | A 07-249541 | 9/1995 |
| JP | A 2001-102252 | 4/2001 |
| JP | A 2005-45068 | 2/2005 |
| JP | A 2005-166740 | 6/2005 |
| JP | A 2005-294291 | 10/2005 |
| JP | A 2006-24966 | 1/2006 |

* cited by examiner

*Primary Examiner*—Eric Thomas
(74) *Attorney, Agent, or Firm*—Oliff & Berridge, PLC

(57) ABSTRACT

A multiterminal-pair solid electrolytic capacitor employing a two-terminal type capacitor element is provided. In the solid electrolytic capacitor 10 in accordance with the present invention, anode terminal patterns 42A (and anode terminals 43A) are connected to an anode part 24 of a capacitor element 12 through anode vias 44A formed in a substrate 14 and an anode pattern 38D formed on a element carrying surface 14a. On the other hand, cathode terminal patterns 42B (and cathode terminals 43B) are connected to a cathode part 28 on the surface of an accumulator 26 of the capacitor element 12 through cathode vias 44B formed in the substrate 14 and cathode patterns 38A to 38C formed on the element carrying surface 14a. Therefore, when the solid electrolytic capacitor 10 is mounted on a packaging substrate from the mounting surface 14b side while a predetermined voltage is applied to four pairs of anode terminals 43A and cathode terminals 43B formed on the mounting surface 14b, the solid electrolytic capacitor 10 functions as a four-terminal-pair solid electrolytic capacitor.

7 Claims, 9 Drawing Sheets

SOLID ELECTROLYTIC CAPACITOR

BACKGROUND OF THE INVENTION

1. Field of the Invention

The present invention relates to a solid electrolytic capacitor.

2. Related Background Art

In general, capacitor elements used in solid electrolytic capacitors are made by employing a metal (so-called valve metal) such as aluminum, titanium, or tantalum capable of forming an insulating oxide film as an anode; anode-oxidizing a surface of the valve metal, so as to form an insulating oxide film; then forming a solid electrolyte layer made of an organic compound or the like substantially functioning as a cathode; and providing a conductive layer such as graphite or silver as a cathode.

For lowering the impedance of such a solid electrolytic capacitor, there are methods of reducing equivalent series inductance (ESL) and equivalent series resistance (ESR). Japanese Patent Application Laid-Open No. 2001-102252 discloses a solid electrolytic capacitor omitting a lead frame in order to reduce ESR. The solid electrolytic capacitor disclosed in this publication is a solid electrolytic capacitor in which a two-terminal type capacitor element having a pair of electrodes is carried on one surface of a substrate, whereas an electrode on the surface of the substrate carrying the capacitor element and an electrode on the rear face thereof are connected to each other through a through hole.

SUMMARY OF THE INVENTION

The above-mentioned capacitor elements encompass those of two-terminal and multiterminal types. A two-terminal type capacitor element has only one anode part, and is used for a solid electrolytic capacitor (single-terminal-pair solid electrolytic capacitor) having only one pair of anode and cathode terminals (terminal pair) in general. On the other hand, a multiterminal type capacitor element has a plurality of anode parts, and is used for a solid electrolytic capacitor (multiterminal-pair solid electrolytic capacitor) having a plurality of terminal pairs in general. The two-terminal type capacitor elements are inexpensive and easily available, since they are simple in element form and are easy to make.

Though such a two-terminal type capacitor element can easily be employed for the above-mentioned single-terminal-pair solid electrolytic capacitor, no techniques have conventionally been known for applying it to the above-mentioned multiterminal-pair solid electrolytic capacitors for which demands have recently been increasing. Therefore, the development of such techniques has been awaited.

For solving the problem mentioned above, it is an object of the present invention to provide a multiterminal solid electrolytic capacitor employing a two-terminal type capacitor element.

The present invention provides a solid electrolytic capacitor comprising a capacitor element having only one anode part and one cathode part, and a substrate for carrying the capacitor element; wherein a surface of the substrate carrying the capacitor element is formed with an anode pattern connected to the anode part and a cathode pattern connected to the cathode part, while the rear face of the substrate opposite to the surface carrying the capacitor element is formed with a plurality of terminal pairs each constituted by an anode terminal and a cathode terminal; and wherein, through a conduction path extending along a thickness of the substrate, each of the plurality of anode terminals and each of the plurality of cathode terminals formed on the rear face are connected to the anode and cathode patterns on the surface carrying the capacitor element, respectively.

In this solid electrolytic capacitor, the rear face is formed with a plurality of pairs of anode and cathode terminals. Each anode terminal is connected to an anode part of a capacitor element through a conduction path formed in the substrate and an anode pattern formed on the surface carrying the capacitor element. On the other hand, each cathode terminal is connected to a cathode part of the capacitor element through a conduction path formed in the substrate and a cathode pattern formed on the surface carrying the capacitor element. Therefore, this solid electrolytic capacitor can function as a multiterminal solid electrolytic capacitor when mounted to a packaging substrate from the rear side while a predetermined voltage is applied to a plurality of pairs of anode and cathode terminals formed on the rear face, for example. Namely, this solid electrolytic capacitor is a multiterminal solid electrolytic capacitor employing a two-terminal type capacitor element.

A region of the rear face corresponding to a element carrying region carrying the capacitor element in the surface carrying the capacitor element may be formed with a plurality of terminal pairs.

At least a part of the plurality of anode terminals may be arranged in a region of the rear face corresponding to a cathode part region opposing the cathode part of the capacitor element in the element carrying region.

One and the other species of the anode and cathode patterns on the surface carrying the capacitor element may be formed singly and plurally, respectively, the plurally formed patterns being connected to a plurality of anode or cathode terminals formed on the rear face through the conduction path.

The anode and cathode patterns may be formed adjacent to each other on the surface carrying the capacitor element, the anode and cathode patterns being connected to the anode and cathode terminals, respectively, through a plurality of conduction paths, the conduction paths for the anode pattern being located in an edge region on the cathode pattern side, the conduction paths for the cathode pattern being located in an edge region on the anode pattern side. When a predetermined voltage is applied to the solid electrolytic capacitor in this case, currents directed opposite to each other flow through the conduction paths for the anode and cathode patterns, respectively. Here, the conduction paths for the anode pattern are located in the edge region on the cathode pattern side, and thus are significantly close to the conduction paths formed in the cathode pattern. The conduction paths for the cathode pattern are located in the edge region on the anode pattern side, and thus are significantly close to the conduction paths formed in the anode pattern. Since the conduction paths for the anode pattern and the conduction paths for the cathode pattern are thus formed in proximity to each other, this solid electrolytic capacitor realizes a lower ESL, thereby reducing its impedance.

At least a part of the plurality of terminal pairs formed on the rear face may be such that the anode and cathode terminals alternate with each other along a predetermined direction. In this case, the solid electrolytic capacitor realizes a further lower ESL.

The solid electrolytic capacitor may comprise a plurality of capacitor elements, stacked in a plurality of stages, having anode parts connected to each other and cathode parts connected to each other, the anode pattern of the substrate being connected to the respective anode parts of the plurality of capacitor elements, the cathode pattern of the substrate being connected to the respective cathode parts of the plurality of capacitor elements. This can increase the capacitance of the solid electrolytic capacitor while suppressing its outer size.

DESCRIPTION OF THE PREFERRED EMBODIMENTS

In the following, modes which seem to be the best for carrying out the invention will be explained in detail with reference to the accompanying drawings. Constituents identical or equivalent to each other will be referred to with numerals identical to each other without repeating their overlapping descriptions if any.

Figure 1:
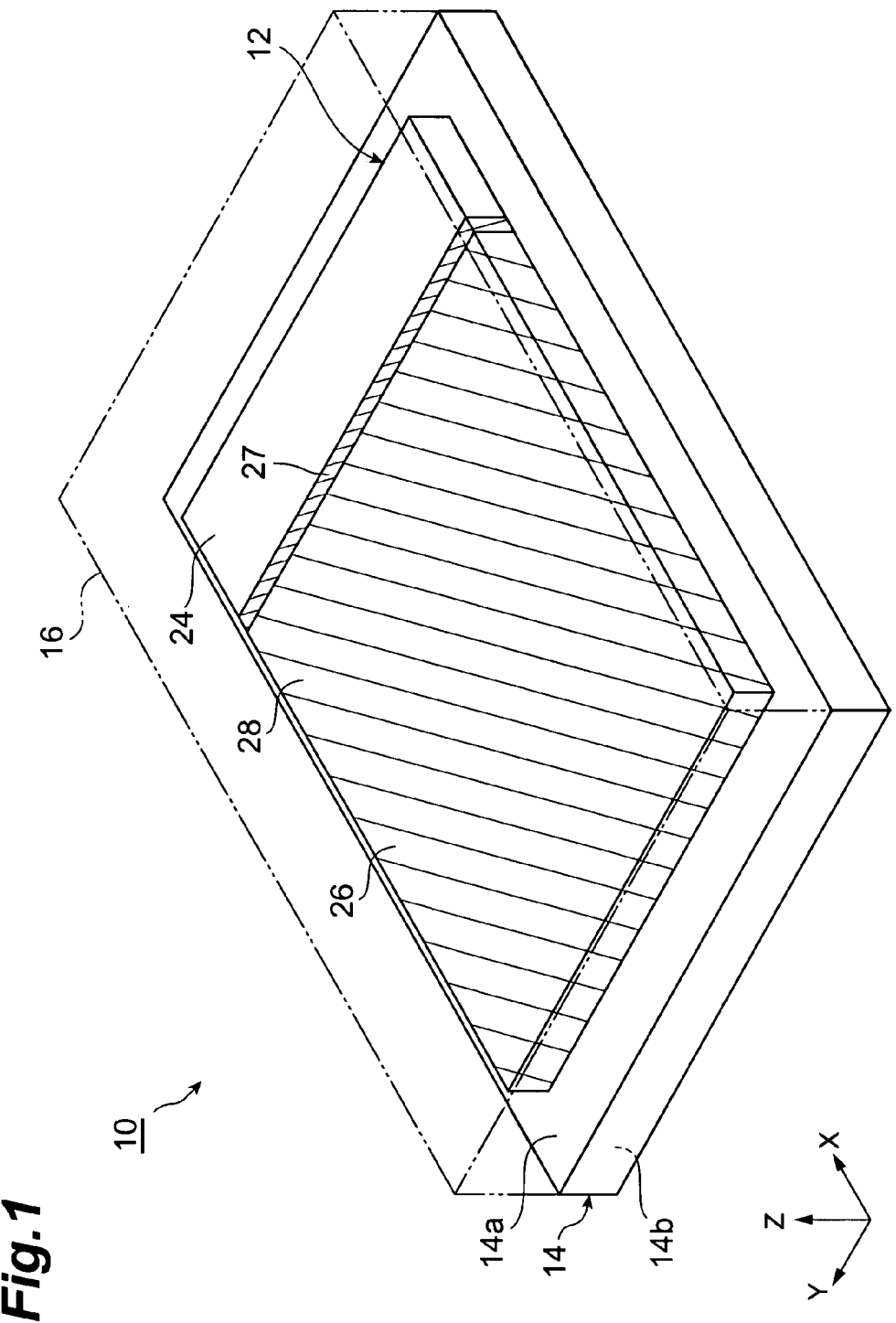
FIG. 1 is a perspective view showing a solid electrolytic capacitor in accordance with an embodiment of the present invention.

FIG. 1 is a perspective view showing an electrolytic capacitor in accordance with an embodiment of the present invention. As shown in FIG. 1, this electrolytic capacitor 10 comprises a capacitor element 12, a substrate 14 shaped like a rectangular thin piece carrying the capacitor element 12, and a resin mold 16 molding the capacitor element 12 and substrate 14.

Figure 2:
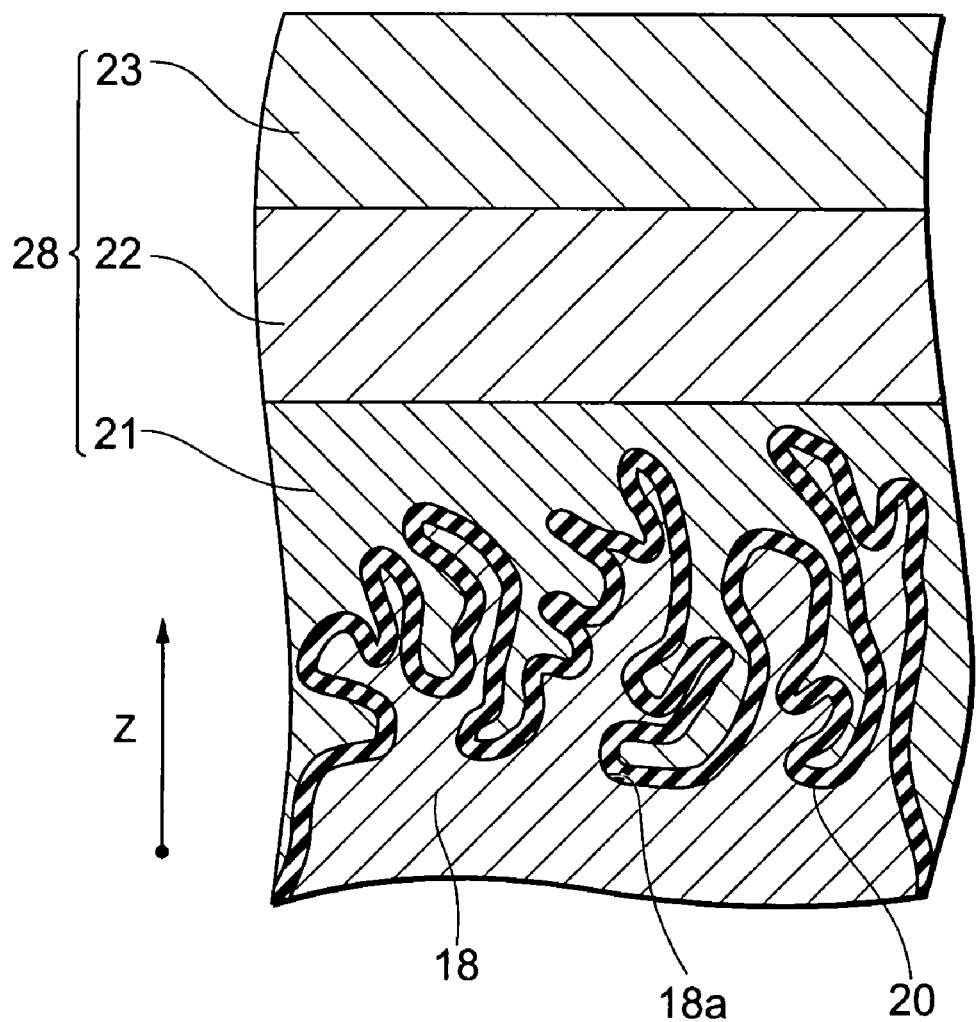
FIG. 2 is a schematic sectional view showing a major part of the solid electrolytic capacitor shown in FIG. 1.

The capacitor element 12 is a two-terminal type capacitor element having one anode part 24 and one cathode part 28, and is formed by successively laminating a solid polymer electrolyte layer and a conductor layer in a part of a region (which will be explained later) on a foil-shaped aluminum support (valve metal support) whose surface is roughened (caused to increase its area) and subjected to a chemical process. This will be explained more specifically with reference to FIG. 2. FIG. 2 is a schematic sectional view showing a major part of the electrolytic capacitor 10 shown in FIG. 1. As shown in FIG. 2, the aluminum support 18 roughened by etching has a surface 18a formed with an insulating aluminum oxide 20 by chemical processing, i.e., anode oxidation. A solid polymer electrolyte layer 21 infiltrates into depressions in the aluminum support 18 having increased its area. The solid polymer electrolyte layer 21 infiltrates into the depressions of the aluminum support 18 while in a monomer state, and then is polymerized by chemical oxidation or electrolytic oxidation.

A graphite paste layer 22 and a silver paste layer 23 (conductor layer) are successively formed on the solid polymer electrolyte layer 21 by any of screen printing, infiltration (dipping), and spray coating. The solid polymer electrolyte layer 21, graphite paste layer 22, and silver paste layer 23 construct a cathode electrode of the capacitor element 12.

As shown in FIG. 1, the capacitor element 12 is shaped like an oblong thin piece and is constituted by an anode part 24 which is one longitudinal end part and an accumulator 26 which is the remainder of the anode part 24. For convenience, the following will be explained while referring to the longer and shorter side directions of the capacitor element 12 as X and Y directions, respectively, and a direction orthogonal to the X and Y directions as Z direction.

As shown in FIG. 2, the anode part 24 is constituted by the aluminum support 18 formed with the aluminum oxide film 20. On the other hand, the accumulator 26 has a structure in which the outer peripheral face of the aluminum support 18 formed with the aluminum oxide film 20 functioning as a dielectric is covered with a cathode part 28 made of the solid polymer electrolyte layer 21, graphite paste layer 22, and silver paste layer 23. A band-like region at the boundary between the anode part 24 and accumulator 26 is formed by an insulating resin layer 27 made of an epoxy resin or a silicone resin.

The capacitor element 12 having the form mentioned above is shaped by punching the aluminum foil whose surface is roughened and chemically processed. Thus shaped aluminum foil is dipped into a chemical liquid, whereby an aluminum oxide film is formed at end faces of the foil exposing aluminum. A preferred example of the chemical liquid is an aqueous solution containing 3% of ammonium adipate.

Figure 3:
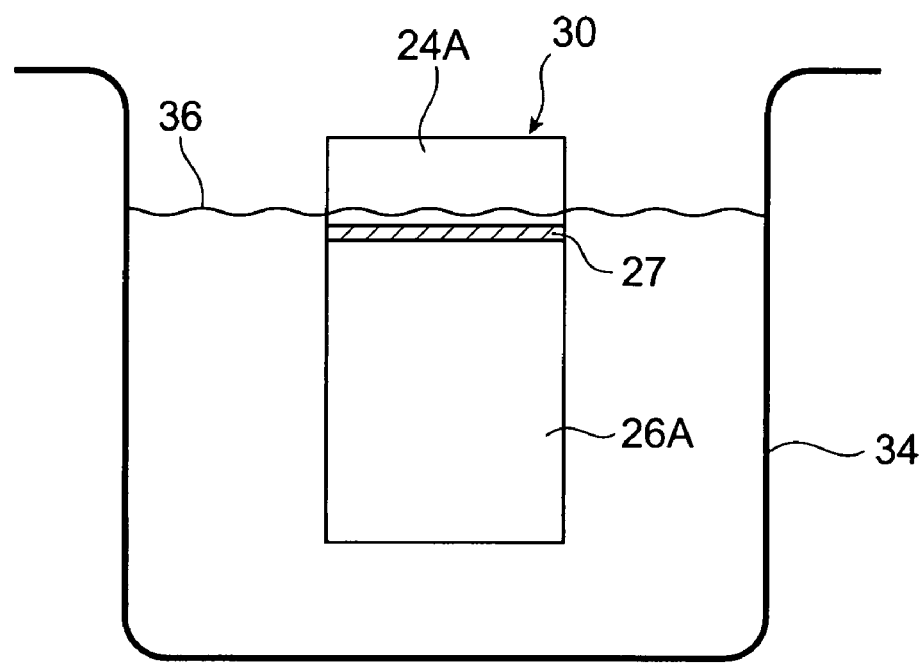
FIG. 3 is a view showing a state where an aluminum foil to become a capacitor element is subjected to an anode-oxidizing process.

The processing for the aluminum foil to become the capacitor element 12 will now be explained with reference to FIG. 3. FIG. 3 is a view showing a state where an aluminum foil 30 to become a capacitor element is being subjected to an anode-oxidizing process. First, in the surface region of a part 24A to become the anode part 24 in the aluminum foil 30, a band-like edge region on the side of a part 26A to become the accumulator 26 is formed with the insulating resin layer 27. Thus forming the insulating resin layer 27 in a predetermined region reliably insulates and separates the anode part 24 and cathode part 28, which will be formed in a later stage, from each other.

Subsequently, while being supported at the part 24A to become the anode part 24, the aluminum foil 30 is dipped into a chemical solution 36 made of an aqueous ammonium adipate solution contained in a stainless beaker 34. Then, a voltage is applied such that thus supported aluminum foil part 24A and stainless beaker 34 are held positive and negative, respectively. The value of applied voltage can appropriately be determined according to the thickness of the aluminum oxide film 20 to be formed, and is typically on the order of several to 20 volts when forming the aluminum oxide film 20 having a thickness of 10 nm to 1 μm.

When anode oxidation is started by voltage application, the chemical solution 36 rises from the liquid level by capillary action through the roughened surface of the aluminum foil 30. Therefore, the aluminum oxide film 20 is formed over the whole roughened surface of the aluminum foil 30 including its end faces. The cathode part 28 is formed on thus made aluminum foil 30 by a known method, whereby the making of the above-mentioned capacitor element 12 is completed.

Figure 4:
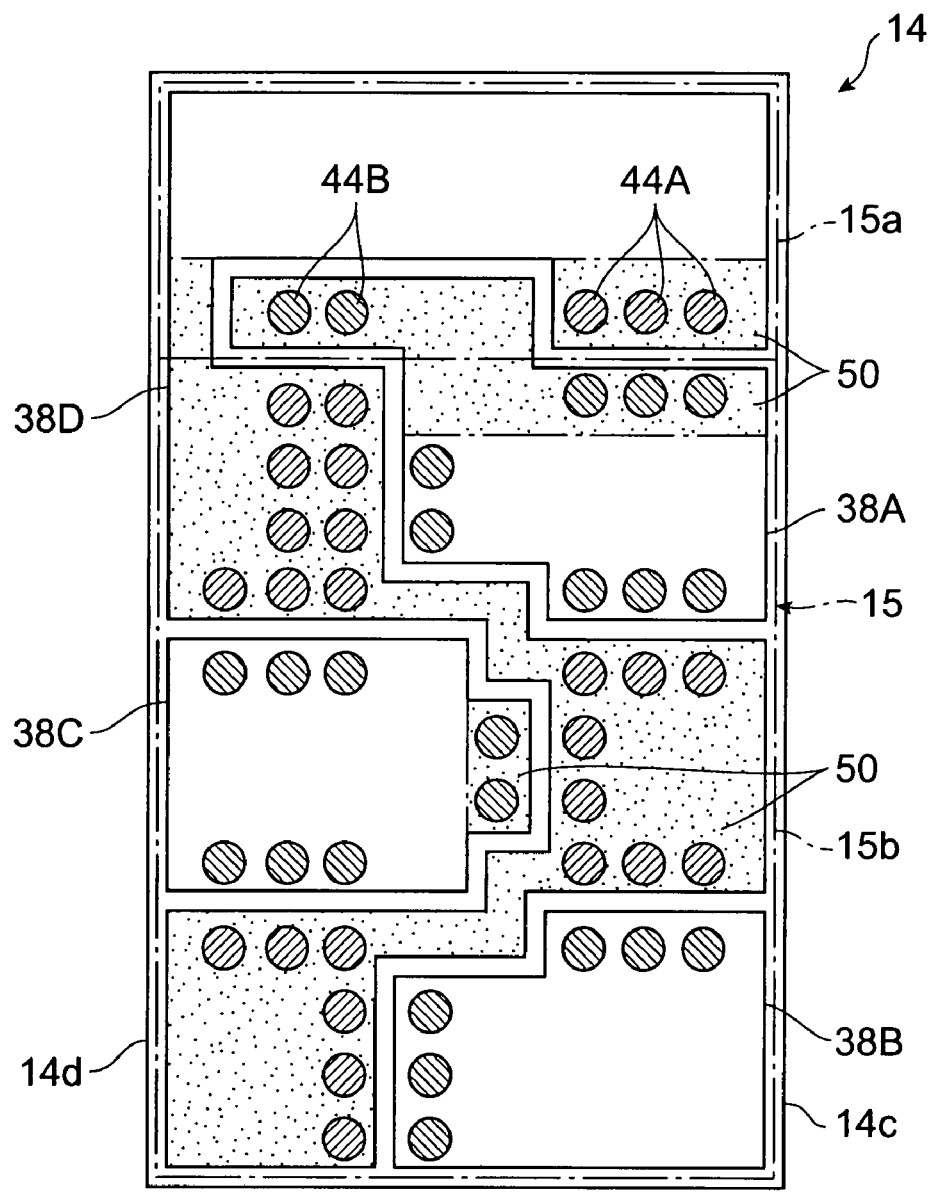
FIG. 4 is a plan view showing the element carrying surface of a substrate.
Figure 5:
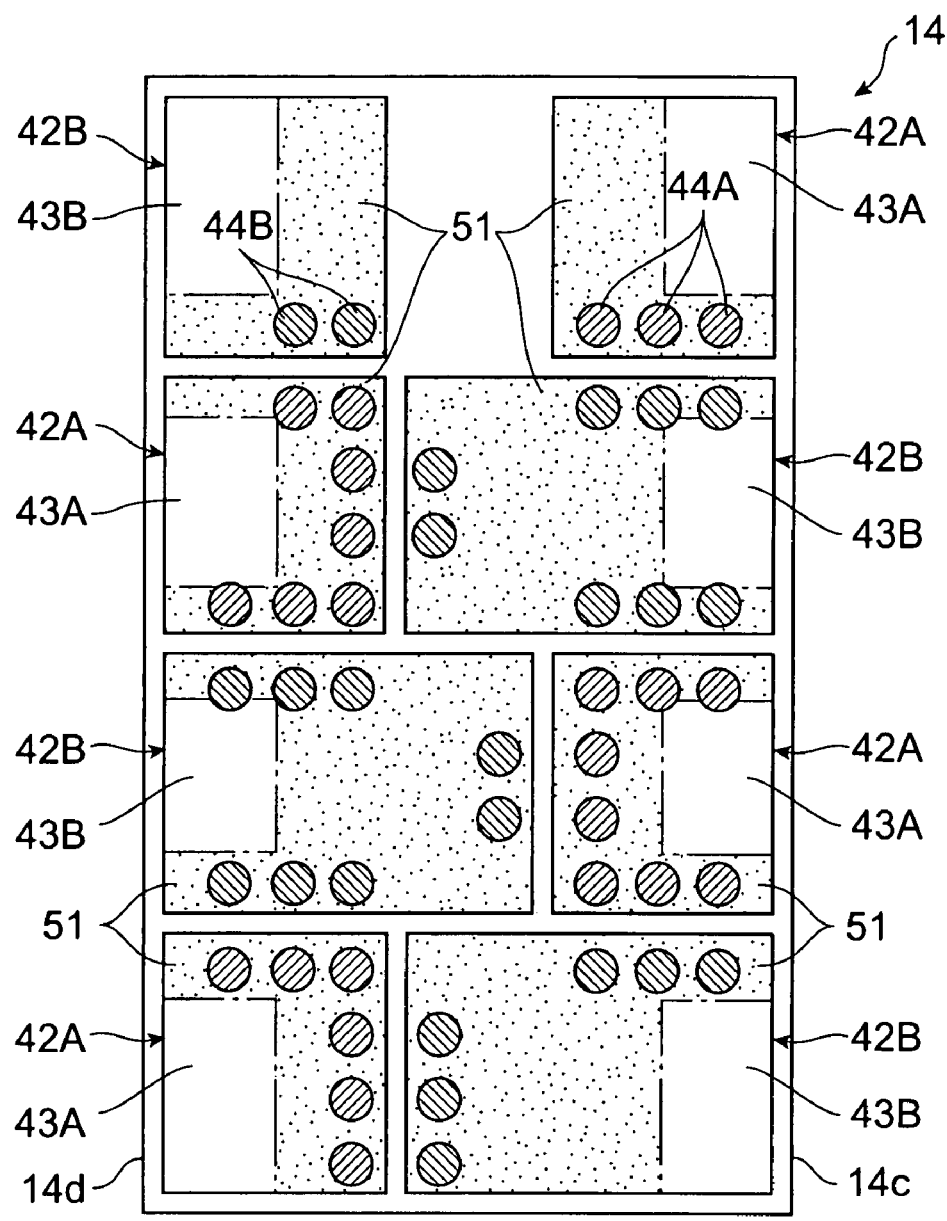
FIG. 5 is a transparent view showing the mounting surface of the substrate.

The support 14 for carrying the capacitor element 12 will now be explained with reference to FIGS. 4 and 5. FIG. 4 is a plan view of the element carrying surface (capacitor element carrying surface) 14a of the substrate 14 seen from the element carrying surface 14a side, whereas FIG. 5 is a transparent view of the rear face (mounting surface) 14b of the element carrying surface 14a of the substrate 14 seen from the element carrying surface 14a side.

The substrate 14 is a printed board made of an FR4 material (epoxy resin material), in which copper foil patterns having predetermined forms are formed by etching on both faces 14a, 14b. As shown in FIG. 4, four electrode patterns 38A to 38D are formed close to each other on substantially the whole element carrying surface 14a for carrying the capacitor element 12 in the substrate 14. The electrode patterns 38A to 38D are formed so as to be included in an oblong element carrying region 15 where the capacitor element 12 is carried in the element carrying surface 14a. In this embodiment, the element carrying region 15 substantially coincides with the whole area of the element carrying surface 14a.

Among the four electrode patterns 38A to 38D, the electrode patterns 38A and 38B have forms directed from one longer-side edge part 14c of the substrate 14 toward the other longer-side edge part 14d and are separated from each other by a predetermined length. By contrast, the electrode pattern 38C has a form directed from the longer-side edge part 14d toward the longer-side edge part 14c, and extends to the gap between the electrode patterns 38A and 38B. The electrode pattern 38D is formed so as to integrally cover the region left by the electrode patterns 38A, 38B, and 38C having the above-mentioned forms.

Here, the element carrying region 15 is constituted by an anode part region 15a facing the anode part 24 of the capacitor element 12 and a cathode part region 15b facing the cathode part 28 on the surface of the accumulator 26 in the capacitor element 12. The electrode pattern 38A is formed so as to overlap with both of the anode part region 15a and cathode part region 15b of the element carrying region 15. The electrode patterns 38B and 38C are formed in the cathode part region 15b of the element carrying region 15. As with the electrode pattern 38A, the electrode pattern 38D is formed so as to overlap with both of the anode part region 15a and cathode part region 15b of the element carrying region 15.

An insulating resin layer 50 (dotted part in FIG. 4) is formed in a predetermined region in the element carrying region 15 formed with the above-mentioned electrode patterns 38A to 38D. This insulating resin layer 50 is constructed by a material such as epoxy resin or silicone resin, and is applied by a thickness of several tens of microns. The insulating resin layer 50 is formed so as to mainly cover the electrode pattern 38D in the cathode part region 15b and the electrode pattern 38A in the anode part region 15a. In other words, parts not covered with the insulating resin layer 50 exist in the electrode pattern 38A in the cathode part region 15b, the electrode pattern 38B, the electrode pattern 38C, and the electrode pattern 38D in the anode part region 15a.

Therefore, when the capacitor element 12 is mounted in the element carrying region 15, the electrode patterns 38A to 38C are connected to only the cathode part 28 of the capacitor element 12, whereas the electrode pattern 38D is connected to only the anode part 24 of the capacitor element 12. Namely, the electrode patterns 38A to 38C correspond to the cathode patterns in the present invention, whereas the electrode pattern 38D corresponds to the anode pattern in the present invention. Hence, in the following explanation, the electrode patterns 38A to 38C will also be referred to as cathode patterns, whereas the electrode pattern 38D will also be referred to as anode pattern.

The anode part 24 of the capacitor element 12 and the electrode pattern (anode pattern) 38D are connected to each other by resistance welding or metal welding such as YAG laser spot, for example. On the other hand, the cathode part 28 on the surface of the accumulator 26 in the capacitor element 12 is connected to the electrode patterns (cathode patterns) 38A to 38C by a conductive adhesive (not depicted), for example.

The rear face 14b of the element carrying surface 14a of the substrate 14 is a mounting surface opposing a packaging substrate, whereas a region of the mounting surface 14b corresponding to the element carrying region 15 is formed with eight terminal patterns 42A, 42B shown in FIG. 5. These eight terminal patterns 42A, 42B are formed four by four in both longer-side edge parts 14c, 14d of the substrate 14. The four terminal patterns 42A, 42B in each of the longer-side edge parts 14c, 14d are aligned while being separated from each other by a predetermined length in a direction (depicted X direction) extending along the edge part. The terminal patterns 42A, 42B in one edge part are paired with their corresponding terminal patterns 42A, 42B in the other edge part, whereas each pair of two terminal patterns 42A, 42B are aligned in the Y direction.

The eight terminal patterns 42A, 42B formed on the mounting surface 14b are constituted by four anode terminal patterns 42A connected to the anode pattern 38D of the element carrying surface 14a, and four cathode terminal patterns 42B connected to the cathode patterns 38A to 38C of the element carrying surface 14a. Namely, the mounting surface 14b of the substrate 14 is formed with four pairs of terminal patterns 42A, 42B each constituted by the anode terminal pattern 42A and cathode terminal pattern 42B.

The anode terminal patterns 42A and cathode terminal patterns 42B alternate with each other in each of the longer-side edge parts 14c, 14d, whereas a pair of the anode terminal pattern 42A and cathode terminal pattern 42B are aligned in the Y direction. The anode terminal patterns 42A and cathode terminal patterns 42B are each partly covered with an insulating resin layer 51 (dotted part in FIG. 5) similar to the insulating resin layer 50, whereas exposed regions not covered with the insulating resin layer 51 actually function as terminals (anode terminals 43A and cathode terminals 43B). As with the anode terminal patterns 42A and cathode terminal patterns 42B, the above-mentioned four pairs of terminals (i.e., four anode terminals 43A and four cathode terminals 43B) alternate with each other in a direction extending along each longer-side edge part 14c, 14d, and align in the Y direction to form a pair (i.e., pair of terminals 43A, 43B). Three of the four anode terminals 43A are arranged in a region of the mounting surface 14b corresponding to the cathode part region 15b in the element carrying region 15.

Through a plurality of anode vias (conduction paths) 44A penetrating through the substrate 14 in the thickness direction (depicted Z direction), the four anode terminals 42A on the mounting surface 14b are connected to the anode pattern 38D formed on the element carrying surface 14a. Through a plurality of cathode vias (conduction paths) 44B penetrating through the substrate 14 in the thickness direction, the four cathode terminals 42B on the mounting surface 14b are connected to their corresponding cathode patterns 38A to 38C formed on the element carrying surface 14a. Each of the anode vias 44A and cathode vias 44B has a circular cross section, and is formed, for example, by drilling a through hole in the substrate 14 and then electrolessly plating it with copper.

As explained in detail in the foregoing, the solid electrolytic capacitor 10 has the two-terminal type capacitor element 12, and the substrate 14 having the mounting surface 14b formed with the four pairs of terminal patterns 42A, 42B (terminal pairs 43A, 43B). In this substrate 14, the anode terminal patterns 42A (and anode terminals 43A) are connected to the anode part 24 of the capacitor element 24 through the anode vias 44A and anode pattern 38D. On the other hand, the cathode terminal patterns 42B (and cathode terminals 43B) are connected to the cathode part 28 on the surface of the accumulator 26 in the capacitor element 12 through the cathode vias 44B and cathode patterns 38A to 38C.

Therefore, when the solid electrolytic capacitor 10 is mounted on a packaging substrate from the mounting surface 14b side while a predetermined voltage is applied to the four pairs of anode terminals 43A and cathode terminals 43B, the solid electrolytic capacitor 10 functions as a four-terminal-pair solid electrolytic capacitor (multiterminal-pair solid electrolytic capacitor). Namely, the solid electrolytic capacitor 10 is a multiterminal-pair solid electrolytic capacitor employing the two-terminal type capacitor element 12.

Since the capacitor element 12 is of two-terminal type, the boundary between the anode part 24 and accumulator 26 can be made linear. In the multiterminal type capacitor element, on the other hand, the boundary between the anode part 24 and accumulator 26 is hard to become linear, since anode parts are arranged in a plurality of places. When the boundary between the anode part 24 and accumulator 26 is linear, the cathode part 28 of the accumulator 26 can be made very easily, since the trouble of preparing and forming complicated mask patterns and separate resist masks or the like can be saved. Namely, the solid electrolytic capacitor 10 employs the two-terminal type capacitor element having the foregoing advantages in the multiterminal-pair solid electrolytic capacitor for which demands have recently been increasing.

Positions of the vias 44A, 44B provided in the substrate 14 will now be explained. As shown in FIG. 4, the anode vias 44A among the vias 44A, 44B are located in edge regions of the anode pattern 38D which face the cathode patterns 38A to 38C. The cathode vias 44B among the vias 44A, 44B are located in edge regions of the cathode patterns 38A to 39C facing the anode pattern 38D so as to be paired with the anode vias 44A.

When the vias 44A, 44B are thus arranged, the distance between the anode vias 44A and their corresponding cathode vias 44B is significantly reduced, whereby each pair of the anode via 44A and cathode via 44B approach each other. When the solid electrolytic capacitor 10 accumulates electric charges or discharges thus accumulated electric charges, currents directed opposite to each other flow though the anode via 44A and cathode via 44B, respectively. Since the anode via 44A and cathode via 44B are close to each other as such, a magnetic field resulting from the current flowing through the anode via 44A and a magnetic field resulting from the current flowing through the anode via 44B effectively cancel each other out. As a result, the equivalent series inductance (ESL) is significantly reduced in the solid electrolytic capacitor 10. In addition, since a plurality of (e.g., 3) pairs of vias 44A, 44B are arranged in each pair of adjacent edge regions of the anode pattern 38D and cathode patterns 38A to 38C, current paths are dispersed, whereby ESL is further reduced. Since the pairs of terminals 43A, 43B are formed on the mounting surface 14b such that the anode terminals 43A and cathode terminals 43B alternate with each other along the X direction, ESL is further reduced in the solid electrolytic capacitor 10.

Figure 6:
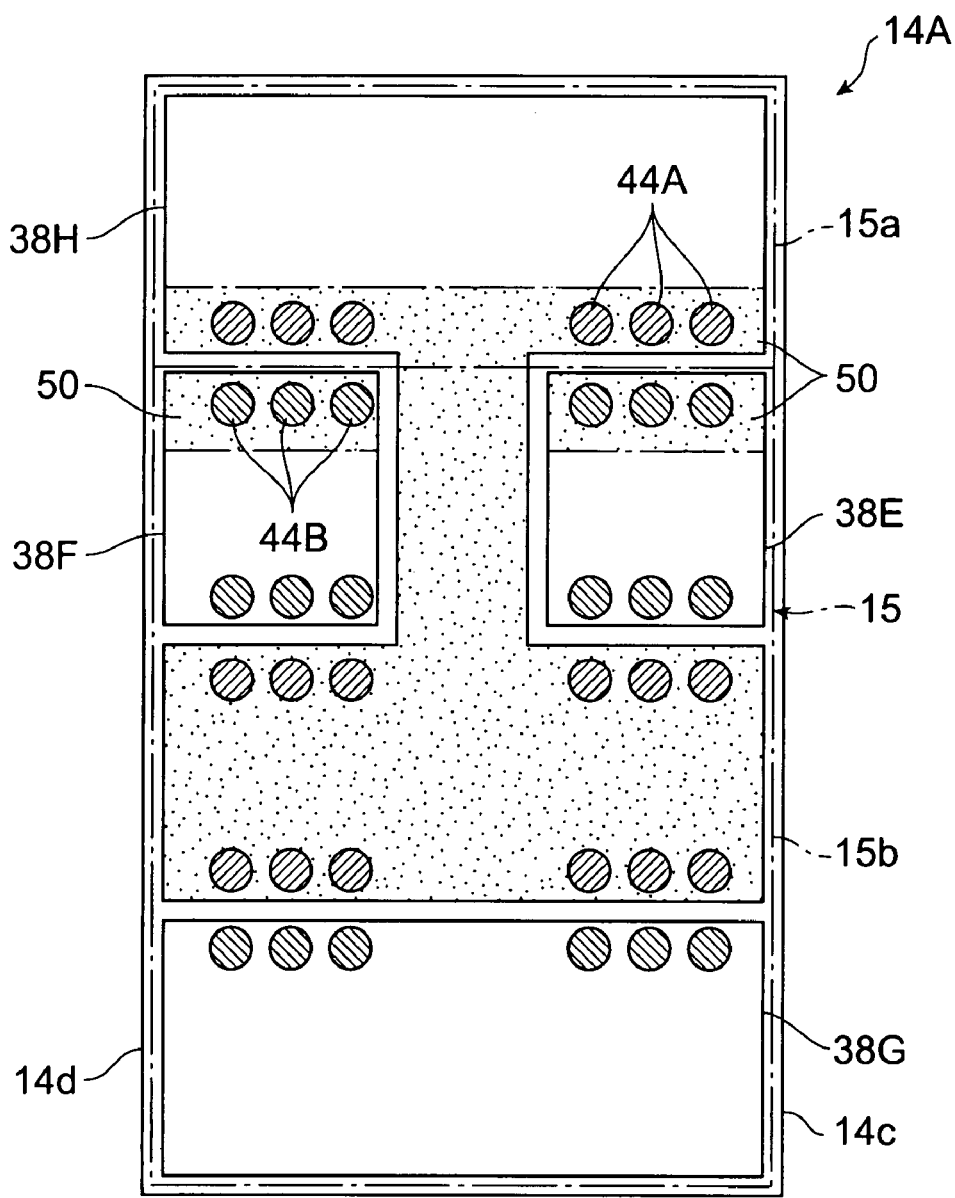
FIG. 6 is a plan view showing the element carrying surface of a substrate in a mode different from that shown in FIGS. 4 and 5.
Figure 7:
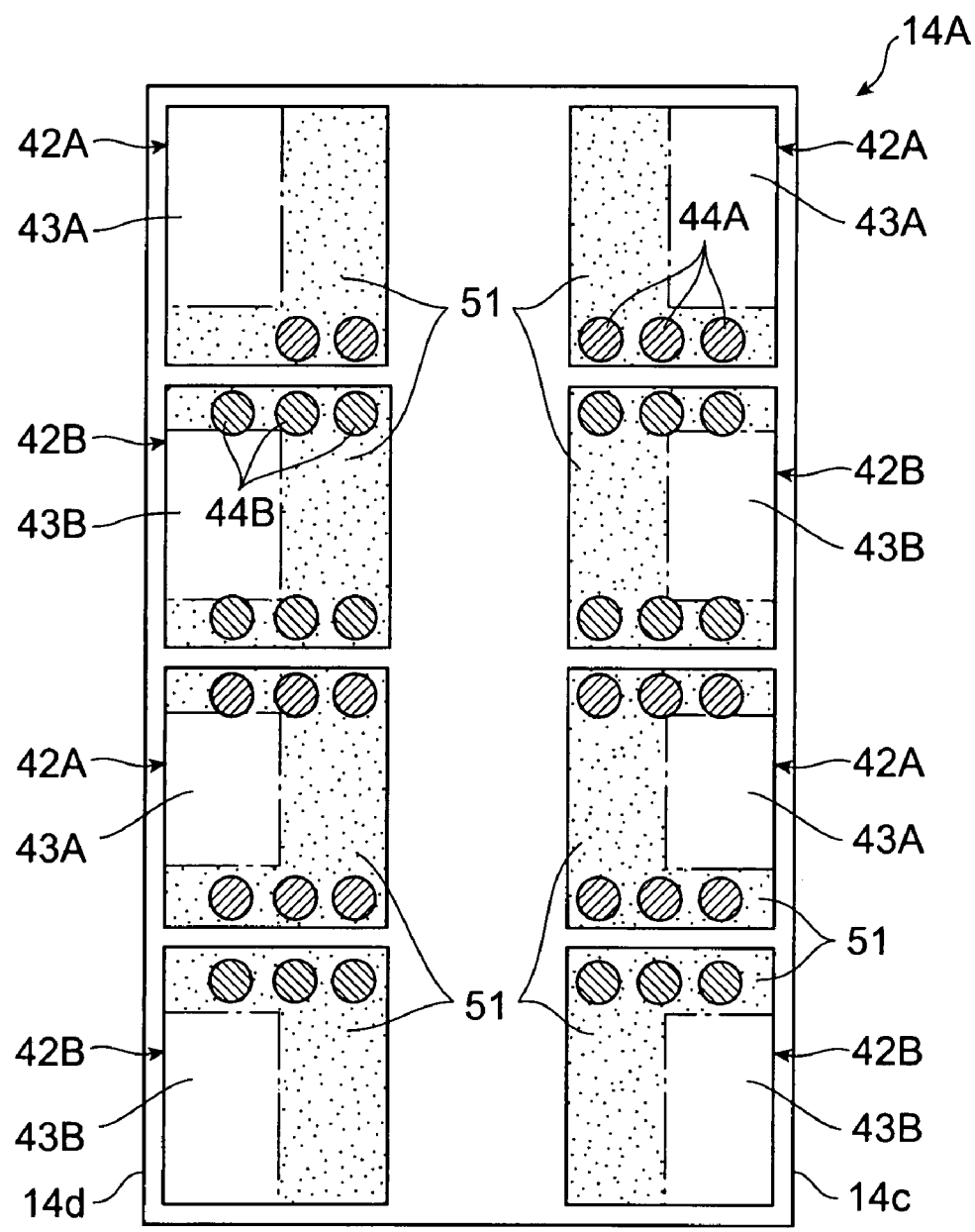
FIG. 7 is a transparent view showing the mounting surface of the substrate shown in FIG. 6.

FIGS. 6 and 7 are views showing a substrate 14A in a mode different from the above-mentioned substrate 14. This substrate 14A differs from that of the substrate 14 in forms of electrode patterns on the element carrying surface 14a and forms of terminal patterns on the mounting surface 14b. Here, FIG. 6 is a plan view of the element carrying surface 14a of the substrate 14A seen from the element carrying surface 14a side, whereas FIG. 7 is a transparent view of the mounting surface 14b of the substrate 14A seen from the element carrying surface 14a side.

As shown in FIG. 6, four electrode patterns 38E to 38H are formed close to each other on substantially the whole element carrying surface 14a of the substrate 14A. The electrode patterns 38E to 38H are formed so as to be included in an oblong element carrying region 15 where the capacitor element 12 is carried in the element carrying surface 14a.

Among the electrode-patterns 38E to 38H, the rectangular electrode patterns 38E and 38F are formed so as to align in the Y direction in their corresponding regions of both longer-side edge parts 14c, 14d of the substrate 14 in the cathode part region 15b of the element carrying region 15. The rectangular electrode pattern 38G is formed in the end part region opposite to the anode part region 15a in the cathode part region 15b of the element carrying region 15. The H-shaped electrode pattern 38H is formed so as to integrally cover the region left by the electrode patterns 38E to 38G having the above-mentioned forms and overlap with both of the anode part region 15a and cathode part region 15b of the element carrying region 15.

The insulating resin layer 50 (dotted part in FIG. 6) of the substrate 14A is formed so as to mainly cover the electrode pattern 38H in the cathode part region 15b. In other words, parts not covered with the insulating resin layer 50 exist in the electrode patterns 38E to 38G and the electrode pattern 38H in the anode part region 15a. Therefore, when the capacitor element 12 is mounted in the element carrying region 15, the electrode patterns 38E to 38G are connected to only the cathode part 28 of the capacitor element 12, whereas the electrode pattern 38H is connected to only the anode part 24 of the capacitor element 12. Namely, the electrode patterns 38E to 38G correspond to cathode patterns in the present invention, whereas the electrode pattern 38H corresponds to the anode pattern in the present invention.

A region of the mounting surface 14b of the substrate 14A corresponding to the element carrying region 15 is formed with eight terminal patterns 42A, 42B shown in FIG. 7. These eight terminal patterns 42A, 42B are formed four by four in both longer-side edge parts 14c, 14d of the substrate 14A, and have the same rectangular form. The four terminal patterns 42A, 42B in each of the longer-side edge parts 14c, 14d are aligned while being separated from each other by a predetermined length in a direction (depicted X direction) extending along the edge part. The terminal patterns 42A, 42B in one edge part are paired with their corresponding terminal patterns 42A, 42B in the other edge part, whereas each pair of two terminal patterns 42A, 42B are aligned in the Y direction.

The eight terminal patterns 42A, 42B formed on the mounting surface 14b are constituted by four anode terminal patterns 42A connected to the anode pattern 38H of the element carrying surface 14a, and four cathode terminal patterns 42B connected to the cathode patterns 38E to 38G of the element carrying surface 14a. Namely, the mounting surface 14b of the substrate 14A is formed with four pairs of terminal patterns 42A, 42B constituted by anode terminal patterns 42A and cathode terminal patterns 42B.

The anode terminal patterns 42A and cathode terminal patterns 42B alternate with each other in each of the longer-side edge parts 14c, 14d. The anode terminal patterns 42A or cathode terminal patterns 42B align with each other in the Y direction. All the cathode terminal patterns 42B are formed in regions corresponding to the cathode patterns 38E to 38G of the element carrying region 15.

The anode terminal patterns 42A and cathode terminal patterns 42B are each partly covered with an insulating resin layer 51 (dotted part in FIG. 7), whereas exposed regions not covered with the insulating resin layer 51 actually function as terminals (i.e., anode terminals 43A and cathode terminals 43B). As with the anode terminal patterns 42A and cathode terminal patterns 42B, the above-mentioned four pairs of terminals (i.e., four anode terminals 43A and four cathode terminals 43B) alternate with each other in a direction extending along each longer-side edge part 14c, 14d, while the anode terminals 43A or cathode terminals 43B align with each other in the Y direction. Two of the four anode terminals 43A are arranged in a region of the mounting surface 14b corresponding to the cathode part region 15b in the element carrying region 15.

Through a plurality of anode vias 44A, the four anode terminal patterns 42A of the mounting surface 14b are connected to the anode pattern 38H formed on the element carrying surface 14a. Through a plurality of cathode vias 44B, the four anode terminal patterns 42B of the mounting surface 14b are connected to their corresponding cathode patterns 38E to 38G formed on the element carrying surface 14a.

As explained in the foregoing, the mounting surface 14b of the substrate 14A is formed with four pairs of terminal patterns 42A, 42B (terminal pairs 43A, 43B). The anode terminal patterns 42A (and anode terminals 43A) are connected to the anode part 24 of the capacitor element 12 through the anode vias 44A and anode pattern 38D. On the other hand, the cathode terminal patterns 42B (and cathode terminals 43B) are connected to the cathode part 28 on the surface of the capacitor element 12 through the cathode vias 44B and cathode patterns 38E to 38G. Therefore, as with the solid electrolytic capacitor 10 equipped with the above-mentioned substrate 14, the solid electrolytic capacitor 10 equipped with the substrate 14A functions as a four-terminal-pair solid electrolytic capacitor (multiterminal solid electrolytic capacitor). Namely, the solid electrolytic capacitor 10 equipped with the substrate 14A is also a multiterminal-pair solid electrolytic capacitor employing the two-terminal type capacitor element 12.

As with the vias 44A, 44B provided in the substrate 14, the vias 44A, 44B provided in the substrate 14A are arranged such that each pair of the anode via 44A and cathode via 44B are close to each other. Namely, as shown in FIG. 6, the anode vias 44A in the vias 44A, 44B are arranged three by three aligning in the Y direction so as to be located in edge regions of the anode pattern 38H facing the cathode patterns 38E to 38G. The cathode vias 44B in the vias 44A, 44B are arranged three by three, in pairs with the anode vias 44A, aligning in the Y direction so as to be located in edge regions of the cathode patterns 38E to 38G facing the anode pattern 38H.

When the vias 44A, 44B are thus arranged, the anode via 44A and cathode via 44B are close to each other, whereby ESL is also significantly reduced in the solid electrolytic capacitor 10 having the substrate 14A. In addition, since a plurality of (e.g., 3) pairs of vias 44A, 44B are arranged in each pair of adjacent edge regions of the anode pattern 38H and cathode patterns 38E to 38G, current paths are dispersed, whereby ESL is further reduced. Since the pairs of terminals 43A, 43B are formed on the mounting surface 14b such that the anode terminals 43A and cathode terminals 43B alternate with each other along the X direction, ESL is further reduced in the solid electrolytic capacitor 10.

Figure 8:
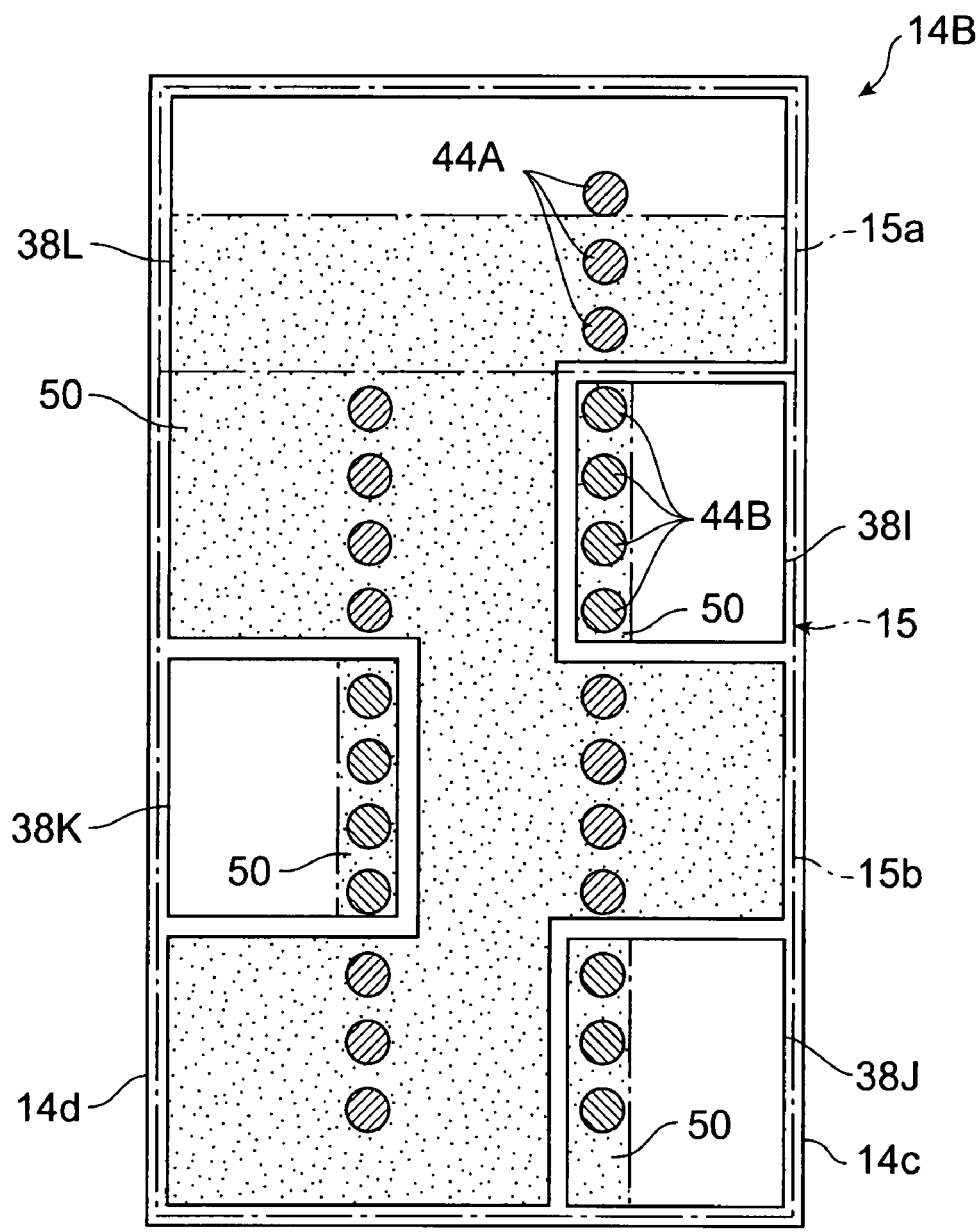
FIG. 8 is a plan view showing the element carrying surface of a substrate in a mode different from the substrate shown in FIGS. 4 and 5 and the substrate shown in FIGS. 6 and 7.
Figure 8:
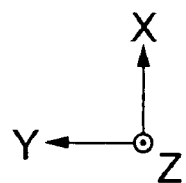
Figure 9:
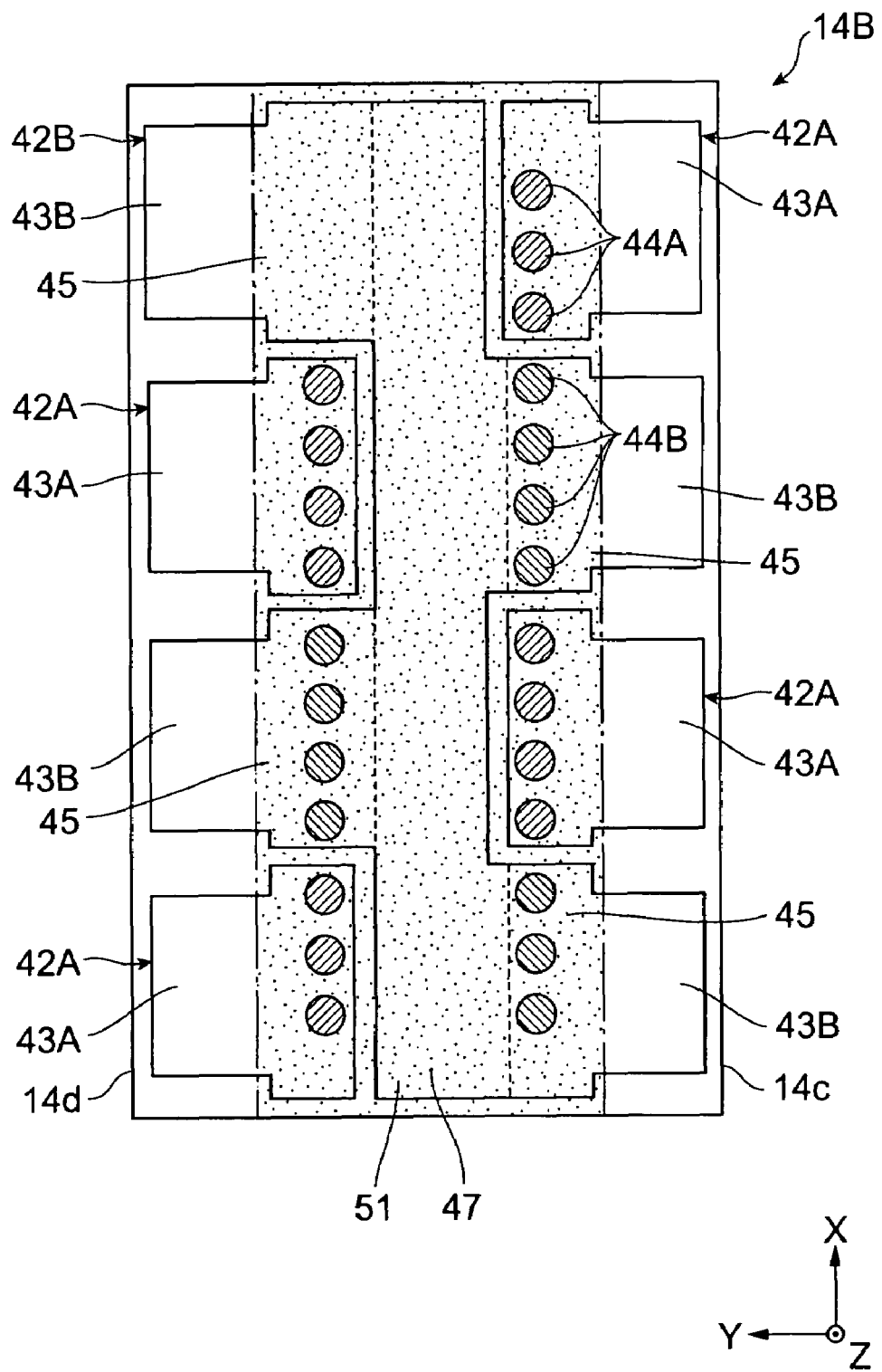
FIG. 9 is a transparent view showing the mounting surface of the substrate shown in FIG. 8.

FIGS. 8 and 9 are views showing a substrate 14B in a mode different from the above-mentioned substrates 14, 14A. This substrate 14B differs from that of the substrates 14, 14A in forms of electrode patterns on the element carrying surface 14a and forms of terminal patterns on the mounting surface 14b. Here, FIG. 8 is a plan view of the element carrying surface 14a of the substrate 14B seen from the element carrying surface 14a side, whereas FIG. 9 is a transparent view of the mounting surface 14b of the substrate 14B seen from the element carrying surface 14a side.

As shown in FIG. 8, four electrode patterns 38I to 38L are formed close to each other on substantially the whole element carrying surface 14a of the substrate 14B. The electrode patterns 38I to 38L are formed so as to be included in an oblong element carrying region 15 where the capacitor element 12 is mounted in the element carrying surface 14a.

Among the electrode patterns 38I to 38L, the rectangular electrode patterns 38I and 38J are formed in one longer-side edge part 14c of the substrate 14B in the cathode part region 15b of the element carrying region 15, while being separated by a predetermined length from each other. The rectangular electrode pattern 38K is formed in the longer-side edge part 14d at a position corresponding to the midpoint between the electrode patterns 38I and 38J in the cathode part region 15b of the element carrying region 15. The electrode pattern 38L is formed so as to integrally cover the region left by the electrode patterns 38I to 38K having the above-mentioned forms and overlap with both of the anode part region 15a and cathode part region 15b of the element carrying region 15.

The insulating resin layer 50 (dotted part in FIG. 8) of the substrate 14B is formed so as to mainly cover the electrode pattern 38L in the cathode part region 15b. In other words, parts not covered with the insulating resin layer 50 exist in the electrode patterns 38I to 38K and the electrode pattern 38L in the anode part region 15a. Therefore, when the capacitor element 12 is mounted in the element carrying region 15, the electrode patterns 38I to 38K are connected to only the cathode part 28 of the capacitor element 12, whereas the electrode pattern 38L is connected to only the anode part 24 of the capacitor element 12. Namely, the electrode patterns 38I to 38K correspond to cathode patterns in the present invention, whereas the electrode pattern 38L corresponds to the anode pattern in the present invention.

A region of the mounting surface 14b of the substrate 14B corresponding to the element carrying region 15 is formed with five terminal patterns 42A, 42B shown in FIG. 9. These five terminal patterns 42A, 42B are constituted by four anode terminal patterns 42A connected to the anode pattern 38L on the element carrying surface 14a, and one cathode terminal pattern 42B connected to the cathode patterns 38I to 38K on the element carrying surface 14a.

The cathode terminal pattern 42B is constituted by four terminal parts 45 positioned in the longer-side edge parts 14c, 14d of the substrate 14B and a connecting part 47 integrally connecting the terminal parts 45 together. The anode terminal patterns 42A and the terminal parts 45 of the cathode terminal pattern 42B alternate with each other in each of the longer-side edge parts 14c, 14d, whereas the anode terminal pattern 42 and the terminal part 45 of the cathode terminal pattern 42B align in the Y direction, so as to form a pair. The anode terminal patterns 42A are formed in regions corresponding to the anode pattern 38L in the element carrying region 15, while three of the four terminal parts 45 of the cathode terminal pattern 42B are formed in regions corresponding to the cathode patterns 38l to 38K in the element carrying region 15.

The connecting part 47 of the cathode terminal pattern 42B is totally covered with an insulating resin layer 51 (dotted part in FIG. 9) similar to the insulating resin layer 50, whereas the anode terminal patterns 42A and the terminal parts 45 of the cathode terminal pattern 42B are each partly covered with the insulating resin layer 51 (dotted part in FIG. 9). The exposed regions of the anode terminal patterns 42A and the terminal parts 45 of the cathode terminal pattern 42B, which are not covered with the insulating resin layer 51, actually function as terminals (anode terminals 43A and cathode terminals 43B). As with the anode terminal patterns 42A and the terminal parts 45 of the cathode terminal pattern 42B, the above-mentioned four pairs of terminals (i.e., four anode terminals 43A and four cathode terminals 43B) alternate with each other in a direction extending along each longer-side edge part 14c, 14d, while aligning in the Y direction in pairs (i.e., pairs of terminals 43A, 43B). Three of the four anode terminals 43A are arranged in a region of the mounting surface 14b corresponding to the cathode part region 15b in the element carrying region 15.

Through a plurality of anode vias 44A, the four anode terminal patterns 42A of the mounting surface 14b are connected to the anode pattern 38L formed on the element carrying surface 14a. Through a plurality of cathode vias 44B, the four anode terminal patterns 42B of the mounting surface 14b are connected to their corresponding cathode patterns 38l to 38K formed on the element carrying surface 14a.

As explained in the foregoing, the mounting surface 14b of the substrate 14B is formed with four pairs of terminal pairs 43A, 43B. The anode terminals 43A are connected to the anode part 24 of the capacitor element 12 through the anode vias 44A and anode pattern 38L. On the other hand, the cathode terminals 43B are connected to the cathode part 28 on the surface of the capacitor element 12 through the cathode vias 44B and cathode patterns 38l to 38K. Therefore, as with the solid electrolytic capacitors 10 equipped with the above-mentioned substrates 14, 14A, the solid electrolytic capacitor 10 equipped with the substrate 14B functions as a four-terminal-pair solid electrolytic capacitor (multiterminal solid electrolytic capacitor). Namely, the solid electrolytic capacitor 10 equipped with the substrate 14B is also a multiterminal-pair solid electrolytic capacitor employing the two-terminal type capacitor element 12.

As with the vias 44A, 44B provided in the substrates 14, 14A, the vias 44A, 44B provided in the substrate 14B are arranged such that each pair of the anode vias 44A and cathode via 44B are close to each other. Namely, as shown in FIG. 8, a part of the anode vias 44A in the vias 44A, 44B are located in edge regions of the anode pattern 38L facing the cathode patterns 38l to 38K. The cathode vias 44B in the vias 44A, 44B are arranged in edge regions of the cathode patterns 38l to 38K facing the anode pattern 38L.

When the vias 44A, 44B are thus arranged, each pair of the anode via 44A and cathode via 44B are close to each other, whereby ESL is also significantly reduced in the solid electrolytic capacitor 10 having the substrate 14B. Since the pairs of terminals 43A, 43B are formed on the mounting surface 14b such that the anode terminals 43A and cathode terminals 43B alternate with each other along the X direction, ESL is further reduced in the solid electrolytic capacitor 10.

Without being restricted to the above-mentioned embodiments, the present invention can be modified in various ways. For example, the number of terminal pairs on the mounting surface is not limited to 4, but can appropriately be decreased or increased to 3, 5, and so forth. The cross-sectional forms of anode vias and cathode vias are not limited to perfect circles, but may be flat circles, quadrangles, and the like. The number of vias may also be decreased or increased as appropriate. The via may be changed to via-hole which is pierced in the central part, if need arises.

Though the above-mentioned embodiments relate to only a solid electrolytic capacitor including one capacitor element, it can be changed to a solid electrolytic capacitor including a plurality of capacitor elements as appropriate. Namely, the above-mentioned capacitor elements are stacked in a plurality of stages, their anode parts are connected to each other while their cathode parts are connected to each other, the anode parts of the capacitor elements are connected to the anode pattern of the substrate, and the cathode parts of the capacitor elements are connected to the cathode pattern of the substrate. Laser welding can be used for connecting the anode parts to each other, whereas a conductive adhesive can be used for connecting the cathode parts to each other.

In a solid electrolytic capacitor in which a plurality of capacitor elements are thus stacked in a plurality of stages, the size of the element carrying region 15 is unchanged, so that the outer size of the solid electrolytic capacitor does not substantially change, while the number of capacitor elements connected in parallel increases, thereby enhancing the capacitance.

EXAMPLES

The present invention will now be explained with reference to examples in order to further clarify its effects.

In the following manner, an electrolytic capacitor similar to the electrolytic capacitor 10 shown in FIG. 1 was made.

First, from a roughened aluminum foil sheet having a thickness of 100 µm and yielding a capacitance of 270 µF/cm$^2$, formed with an aluminum oxide film, an aluminum anode electrode body was made by punching such as to have the same form as the aluminum foil 30 shown in FIG. 3 and such that the part excluding the part corresponding to the anode part (corresponding to numeral 24A in FIG. 3) attained a size of 4.7 mm×3.5 mm (area: 0.165 cm$^2$). In the punched electrode body, the roughened structure in the region formed with the insulating resin layer (region corresponding to numeral 27 in FIG. 3) was destroyed by pressing. In thus made electrode body, only the surface of the pressed region (region corresponding to numeral 27 in FIG. 3) was coated with an epoxy resin applied thereto.

Further, thus obtained electrode body was set into an aqueous ammonium adipate solution adjusted to a pH of 6.0 having a concentration of 3 wt % such that the roughened aluminum foil formed with the aluminum oxide film was completely immersed therewith. Here, the electrode body was dipped into the aqueous ammonium adipate solution up to a part of the region coated with the epoxy resin.

Subsequently, using the part not coated with the epoxy resin (corresponding to numeral 24A in FIG. 3) corresponding to the anode part as an anode, the electrode body dipped in the aqueous solution was oxidized under the condition of a processing current density of 50 to 100 mA/cm$^2$ and a processing voltage of 12 V, so as to form an aluminum oxide film at the cut end faces of the electrode body.

Thereafter, the electrode body was lifted from the aqueous solution, and a solid polymer electrolyte layer made of polypyrrole was formed by chemical oxidation polymerization on the roughened surface of the aluminum foil. More specifically, the electrode body was set into a cell of an ethanol/water mixed solution containing purified 0.1 mol/l of pyrrole monomer, 0.1 mol/l of sodium alkylnaphthalene sulfonate, and 0.05 mol/l of iron sulphate (III) such that only the roughened aluminum foil part (corresponding to numeral 26A in FIG. 3) formed with the aluminum oxide film was dipped therein, they were stirred for 30 minutes, so as to advance the chemical oxidation polymerization, and the same operation was repeated three times, whereby the solid polymer electrolyte layer made of polypyrrole was produced. As a result, the solid polymer electrolyte layer having the maximum thickness of about 50 μm was formed.

A carbon paste and a silver paste were successively applied to the surface of thus laminated solid polymer electrolyte layer, whereby a cathode part similar to the cathode part 28 of the capacitor element 12 shown in FIG. 1 was formed.

Six capacitor elements made as mentioned above were stacked, so as to form a element multilayer body. Thirty such element multilayer bodies were prepared. Using these element multilayer bodies, thirty solid electrolytic capacitors were made. Laser welding was used for connecting the anode parts to each other, whereas a silver-epoxy-based conductive adhesive was used for connecting the cathode parts to each other.

The substrate used for each solid electrolytic capacitor was an electrolytic capacitor packaging substrate (7.3 mm×4.3 mm) whose front and rear faces were formed with copper foil electrode patterns shown in FIG. 4 (the element carrying surface) and FIG. 5 (the rear face of the element carrying surface), and patterning was effected by using a known photolithography technique. It was prepared by the following technique. Here, the substrate was a glass-cloth-containing, heat-resistant epoxy resin substrate (FR4 substrate) with a substrate thickness of 0.5 mm and a copper foil pattern thickness of 36 μm.

Through holes (having a diameter of 0.2 mm) were formed at via positions of the substrate 14 in FIG. 4, whereas the inner walls of the through holes, the electrode pattern surface on the substrate surface, and the terminal pattern surface on the rear face of the substrate were electrolessly plated with 3 μm of nickel. Further, the nickel plating was plated with 0.08 μm of gold. Furthermore, copper plating was performed so as to fill all of the above-mentioned through holes, thereby forming vias.

After forming the vias, a coating of an epoxy resin having a thickness of 50 μm was applied by screen printing in order to form an insulating resin layer in a predetermined region (corresponding to the region of numeral 50 in FIG. 4 and the region of numeral 51 in FIG. 5).

The capacitor elements of the element multilayer body were mounted on the substrate with a silver-based conductive adhesive such that their cathode parts overlapped with the cathode patterns on the substrate surface. The anode parts of the capacitor elements of the element multilayer body were connected by welding to the anode patterns on the substrate surface with a YAG laser spot welder manufactured by NEC.

In the foregoing manner, 30 four-terminal-pair solid electrolytic capacitors #1 such as the one shown in FIG. 1 were prepared.

For comparison, using the element multilayer bodies made by the above-mentioned method, 30 each of conventional one-terminal-pair solid electrolytic capacitors #2 in which a element multilayer body was mounted on a resin substrate and conventional (one-terminal-pair) lead-frame type solid electrolytic capacitors #3 were prepared.

For each species of the solid electrolytic capacitors #1, #2, and #3, average values of electric characteristics per 30 pieces were evaluated. Specifically, each of the solid electrolytic capacitors #1, #2, and #3 was mounted on a predetermined evaluation substrate, and the capacitance and $S_{21}$ characteristic were measured by using an impedance analyzer 4194A and network analyzer 8753D manufactured by Agilent Technologies. According to thus obtained $S_{21}$ characteristic, equivalent circuit simulation was performed, so as to determine ESR and ESL values. The results were as shown in the following Table 1.

TABLE 1

| Sample | Number of terminal pairs | ESL (pH) | ESR (m Ω) <100 kHz> | Capacitance (μF) <120 Hz> |
|---|---|---|---|---|
| Sample #1 | 4 | 450.3 | 6.5 | 225.6 |
| Sample #2 | 1 | 876.4 | 7.3 | 223.4 |
| Sample #3 | 1 | 1237.5 | 8.5 | 226.4 |

As can be seen from Table 1, ESL was greatly reduced in the solid electrolytic capacitor #1 as compared with the conventional solid electrolytic capacitors #2, #3. The solid electrolytic capacitor #1 also yielded a better characteristic for ESR as compared with the conventional solid electrolytic capacitors #2, #3. Thus, the present invention not only provides a multiterminal-pair solid electrolytic capacitor employing a two-terminal-type capacitor element, but also improves electric characteristics of the solid electrolytic capacitor.

The present invention provides a multiterminal-pair solid electrolytic capacitor employing a two-terminal-type capacitor element.

What is claimed is:

1. A solid electrolytic capacitor comprising a capacitor element having only one anode part and one cathode part, and a substrate for carrying the capacitor element;

wherein a surface of the substrate carrying the capacitor element is formed with an anode pattern connected to the anode part and one or more cathode patterns connected to the cathode part, while a rear face of the substrate opposite to the surface carrying the capacitor element is formed with a plurality of terminal pairs each constituted by an anode terminal and a cathode terminal; and wherein, through a conduction path extending along a thickness of the substrate, each of the plurality of anode terminals and each of the plurality of cathode terminals formed on the rear face are connected to the anode and cathode patterns on the surface carrying the capacitor element, respectively.

2. A solid electrolytic capacitor according to claim 1, wherein a region of the rear face corresponding to an element carrying region carrying the capacitor element in the surface carrying the capacitor element is formed with the plurality of terminal pairs.

3. A solid electrolytic capacitor according to claim 2, wherein at least a part of the plurality of anode terminals is arranged in a region of the rear face corresponding to a cathode part region opposing the cathode part of the capacitor element in the element carrying region.

4. A solid electrolytic capacitor according to claim 1, wherein one and an other species of the anode and cathode patterns on the surface carrying the capacitor element are formed singly and plurally, respectively, the plurally formed patterns being connected to the plurality of anode or cathode terminals formed on the rear face through the conduction path.

5. A solid electrolytic capacitor according to claim 1, wherein the anode and cathode patterns are formed adjacent to each other on the surface carrying the capacitor element; and wherein the anode and cathode patterns are connected to the plurality of anode and cathode terminals, respectively, through a plurality of conduction paths, the conduction paths for the anode pattern being located in an edge region on a cathode pattern side, the conduction paths for the cathode pattern being located in an edge region on an anode pattern side.

6. A solid electrolytic capacitor according to claim 1, wherein at least a part of the plurality of terminal pairs formed on the rear face are such that the anode and cathode terminals alternate with each other along a predetermined direction.

7. A solid electrolytic capacitor according to claim 1, comprising a plurality of capacitor elements, stacked in a plurality of stages, having anode parts connected to each other and cathode parts connected to each other;

wherein the anode pattern of the substrate is connected to respective anode parts of the plurality of capacitor elements, while the cathode pattern of the substrate is connected to the cathode parts of the plurality of capacitor elements.

* * * * *